(12) United States Patent  
Hommes et al.

(10) Patent No.: US 11,041,533 B1
(45) Date of Patent: Jun. 22, 2021

(54) METHOD FOR ADAPTING AN ENGAGEMENT POINT OF A VEHICLE CLUTCH

(71) Applicant: AUDI AG, Ingolstadt (DE)

(72) Inventors: Georg Hommes, Ingolstadt (DE); Andreas Schiergl, Schierling (DE)

(73) Assignee: AUDI AG, Ingolstadt (DE)

( * ) Notice: Subject to any disclaimer, the term of this patent is extended or adjusted under 35 U.S.C. 154(b) by 521 days.

(21) Appl. No.: 16/081,465

(22) PCT Filed: Feb. 20, 2017

(86) PCT No.: PCT/EP2017/053818
§ 371 (c)(1),
(2) Date: Aug. 31, 2018

(87) PCT Pub. No.: WO2017/148728
PCT Pub. Date: Sep. 8, 2017

(30) Foreign Application Priority Data

Mar. 2, 2016 (DE) ...................... 10 2016 203 434.0

(51) Int. Cl.
*F16D 48/06* (2006.01)
(52) U.S. Cl.
CPC ...... *F16D 48/06* (2013.01); *F16D 2500/1066* (2013.01); *F16D 2500/3065* (2013.01); *F16D 2500/30426* (2013.01); *F16D 2500/3165* (2013.01); *F16D 2500/50281* (2013.01)
(58) Field of Classification Search
CPC ............ F16D 48/06; F16D 2500/1066; F16D 2500/30415; F16D 2500/30417; F16D 2500/3067; F16D 2500/25; F16D 2500/3068; F16D 2500/30426; F16D 2500/3065; F16D 2500/3165; F16D 2500/50245; F16D 2500/50251; F16D 2500/50269; F16D 2500/50281
See application file for complete search history.

(56) References Cited

U.S. PATENT DOCUMENTS

2009/0011899 A1* 1/2009 Reuschel ............... B60K 6/387
477/5
2009/0255743 A1 10/2009 Dilzer et al.
(Continued)

FOREIGN PATENT DOCUMENTS

| CN | 104712686 A | 6/2015 |
| DE | 10228709 A1 | 2/2003 |
| DE | 102013220399 A1 | 5/2014 |

(Continued)

OTHER PUBLICATIONS

Office Action dated Jun. 25, 2019, in corresponding Chinese Application No. 201780014544.5; 14 pages.
(Continued)

*Primary Examiner* — Edwin A Young
(74) *Attorney, Agent, or Firm* — Maier & Maier, PLLC

(57) ABSTRACT

A method for adapting an engagement point of a disconnect clutch that can be moved between at least one engaged state, in which an output shaft of an internal combustion engine for propelling a vehicle is coupled by way of the disconnect clutch to a rotor of an electric machine for propelling the vehicle, and at least one disengaged state, in which the output shaft is decoupled from the rotor.

7 Claims, 1 Drawing Sheet

(56) References Cited

U.S. PATENT DOCUMENTS

2011/0295455 A1* 12/2011 Schenk .................... B60K 6/48
                                                        701/22
2017/0088116 A1*  3/2017 Kim ...................... B60W 10/08

FOREIGN PATENT DOCUMENTS

| DE | 102013103878 A1 | 10/2014 |
|----|-----------------|---------|
| DE | 102013208256 A1 | 11/2014 |
| DE | 102013226115 A1 | 7/2015  |
| EP |       2014946 A2 | 1/2009  |
| WO |    2008/064633 A1 | 6/2008  |
| WO |    2009/127459 A1 | 10/2009 |
| WO |    2011/134451 A1 | 11/2011 |
| WO |    2015/086013 A2 | 6/2015  |

OTHER PUBLICATIONS

Notification of Transmittal of Translation of the International Preliminary Report on Patentability dated Sep. 13, 2018, in connection with corresponding international Application No. PCT/EP2017/053818 (15 pgs., including English translation).

Examination Report dated Oct. 14, 2016 of corresponding German Application No. 102016203434.0; 6 pgs.

International Search Report with English translation and Written Opinion dated May 15, 2017 of corresponding International Application No. PCT/EP2017/053818; 17 pgs.

* cited by examiner

METHOD FOR ADAPTING AN ENGAGEMENT POINT OF A VEHICLE CLUTCH

FIELD

The invention relates to a method for adapting an engagement point of a disconnect clutch for a vehicle.

BACKGROUND

Such a method for adapting an engagement point of a disconnect clutch for a vehicle is known, for example, from DE 102 28 709 A1. The disconnect clutch can be moved between at least one closed or engaged state and at least one opened or disengaged state. In the engaged state, an output shaft of an internal combustion engine for propelling a vehicle is coupled via the disconnect clutch to a rotor of an electric machine for propelling the vehicle. In the disengaged state, the output shaft is decoupled from the rotor. In other words, the output shaft in the disengaged state of the disconnect clutch is not coupled via the disconnect clutch to the rotor.

The engagement point of the disconnect clutch is also called the touch point and it is, for example, the position in which the disconnect clutch transmits a predetermined, small torque. In other words, the engagement or touch point is to be understood, for example, as the position in which the disconnect clutch couples a first shaft, such as, for example, the output shaft, to a second shaft, such as, for example, the rotor, so that, for example, a rotation of the first shaft is influenced by the second shaft via the disconnect clutch, for example, to a certain degree, and vice versa. By the adapting of the engagement or touch point, for example, it is possible to compensate for wear-related and/or temperature-caused changes in the engagement point, so that an automatic engaging and disengaging of the disconnect clutch, that is, an engaging and disengaging performed, for example, by means of an electronic computing device by way of at least one actuator, can be accomplished as needed, especially in a comfortable manner. By the engaging of the disconnect clutch is meant the moving of the disconnect clutch from the disengaged state to the engaged state. By the disengaging of the disconnect clutch is meant the moving of the disconnect clutch from the engaged state to the disengaged state.

Furthermore, WO 2009/127459 A1 discloses a control/regulating device for a vehicle propulsion having at least one drive assembly and one automatic clutch situated in a drive train of the vehicle drive unit, which is disengaged or engaged upon passing between two consecutive idling states. At least one idle regulator with an integrator is provided for regulating an idling rotational speed of the drive assembly. Moreover, it is provided that a control operation occurs during the transition, in order to avoid deviations between an actual value of the idling rotational speed and a desired value.

Furthermore, DE 10 2013 220 399 A1 discloses a method for controlling a hybrid drive train with an internal combustion engine having a crankshaft and an electric machine situated in a belt pulley plane of the internal combustion engine and standing in operative connection with the crankshaft by means of a shiftable planetary gearbox. The planetary gearbox during a starting process of the internal combustion engine is controlled by an actuator to move along an actuation path to a predetermined engaging position, activating a brake situated between a ring gear of the planetary gearbox and a rotationally fixed housing. It is provided that the engaging position is compared to a touch point between ring gear and housing, this touch point being determined by means of a gradient change ascertained from an electric control variable of the actuator and a travel velocity of the actuator, and is adjusted as a function of this.

SUMMARY

The object of the present invention is to further develop a method of the kind mentioned above so that the engagement point of the disconnect clutch can be adapted especially precisely and quickly.

The invention relates to a method for adapting an engagement point of a disconnect clutch of a vehicle, especially a motor vehicle such as a hybrid vehicle. The disconnect clutch can be moved between at least one engaged state and at least one disengaged state. In the engaged state, an output shaft of an internal combustion engine for propelling the vehicle is coupled via the disconnect clutch to a rotor of an electric machine for propelling the vehicle. In the disengaged state, the output shaft is decoupled from the rotor. In other words, the output shaft in the disengaged state of the disconnect clutch is not coupled via the disconnect clutch to the rotor of the electric machine.

Now, in order to adapt the engagement point of the disconnect clutch especially precisely and quickly, that is, in a short time, the method according to the invention involves a first step, during which the initially activated internal combustion engine is deactivated and the initially engaged disconnect clutch is disengaged. In other words, starting from an operating state in which the internal combustion engine is activated and a disconnect clutch is engaged, the internal combustion engine is deactivated and the disconnect clutch is disengaged. By the disengaging of the disconnect clutch is meant that the clutch is moved from the engaged state to the disengaged state. Accordingly, by an engaging of the disconnect clutch is meant that the clutch is moved from its disengaged state to its engaged state.

By the deactivating of the internal combustion engine is meant that a fired operation of the internal combustion engine is ended, so that the internal combustion engine is switched from its fired operation to its unfired or non-fired operation. Accordingly, by the activated internal combustion engine is meant that the internal combustion engine is operated in its fired operation. Hence, by an activating of the internal combustion engine is meant that the unfired or non-fired operation of the internal combustion engine is ended, so that the initially deactivated internal combustion engine is switched from its unfired operation to its fired operation. Accordingly, the deactivated internal combustion engine is understood to mean that the internal combustion engine is in its unfired or non-fired operation or not in its fired operation. In the unfired operation of the internal combustion engine, no combustion processes take place in its combustion chambers, which are designed, for example, as cylinders.

In a second step of the method according to the invention, while the disconnect clutch is disengaged and the internal combustion engine is deactivated, a first course or curve of the rotational speed of the output shaft is recorded. The rotational speed of the output shaft or, in particular, the time function of the rotational speed of the output shaft is recorded, for example, from a first rotational speed to the second rotational speed of the output shaft. Since the disconnect clutch is disengaged and the internal combustion engine is deactivated while the first curve is being recorded, the rotational speed of the output shaft or the curve of the rotational speed of the output shaft usually decreases from the first rotational speed to the second rotational speed.

In a third step of the method, a friction torque of the internal combustion engine is calculated as a function of at least one predetermined moment of inertia of the internal combustion engine and a first rotational speed gradient, which is determined from the recorded first curve. For example, the first rotational speed gradient is determined from a first rotational speed interval of the first curve. The first rotational speed interval is, for example, at least a first part of the first curve. The first rotational speed gradient thus describes a change in the rotational speed of the output shaft or the curve of the rotational speed of the output shaft in the first rotational speed interval.

The moment of inertia of the internal combustion engine is saved, for example, in a storage device, especially an electronic computing device. The friction torque of the internal combustion engine is calculated, for example, by means of the electronic computing device, which is also designated as a controller, in that the electronic computing device retrieves the saved moment of inertia from the storage device. Furthermore, the electronic computing device determines, in particular calculates, as a function of the recorded first curve, the first rotational speed gradient, so that ultimately the friction torque of the internal combustion engine is calculated as a function of the first rotational speed gradient and as a function of the given moment of inertia. For this, the first rotational speed gradient is multiplied by the given moment of inertia.

In a fourth step of the method, preferably coming after the first step and the second step, the disconnect clutch is moved in the direction of its engaged state. This should be taken to mean, for example, that the disconnect clutch, starting from its disengaged state, is moved from the disengaged state in the direction of the engaged state, but not entirely into the engaged state, so that the disconnect clutch takes up an intermediate state, for example, one lying between the engaged state and the disengaged state.

In a fifth step of the method, while the disconnect clutch is being moved in the direction of its engaged state and the internal combustion engine is still deactivated, a second curve of the rotational speed of the output shaft is recorded, coming after the first curve. In a sixth step of the method, a second rotational speed gradient is determined from the recorded second curve. For example, the second rotational speed gradient is determined from a second rotational speed interval of the second curve, wherein the second rotational speed interval is at least a second part of the second curve, for example. The second rotational speed interval, for example, comes later in time than the first rotational speed interval and extends, for example, from a third rotational speed, which is different from the first and the second rotational speed, to a fourth rotational speed, which is different from the first, the second, and the third rotational speeds, so that the second curve describes the rotational speed and especially the change in the rotational speed of the output shaft in the second rotational speed curve.

For example, the disconnect clutch in the second rotational speed interval is moved in the direction of its engaged state or is already found in the intermediate state. Since the disconnect clutch is disengaged when recording the first curve, the first curve or the rotational speed of the output shaft is not influenced by the electric machine when recording the first curve. Since, during the recording of the second curve, the disconnect clutch is moved from its disengaged state in the direction of its engaged state, there occurs an influencing of the rotational speed of the output shaft, brought about by the electric machine, for example, during the recording of the second curve, and this influencing is recognizable with the help of the second curve.

In a seventh step of the method, a reaction moment of the disconnect clutch, especially a reaction moment of the disconnect clutch resulting from the moving of the disconnect clutch from its disengaged state in the direction of its engaged state, is determined as a function of the calculated friction torque, the second rotational speed gradient, and the predetermined moment of inertia of the internal combustion engine. For example, the second rotational speed gradient is multiplied by the moment of inertia of the internal combustion engine. This multiplication results, for example, in an overall torque, from which the previously calculated friction torque is subtracted. The result of this subtraction is, for example, the mentioned reaction moment. Finally, in an eighth step of the method, the engagement point of the disconnect clutch is adapted as a function of the determined reaction moment.

In the course of the fourth step, that is, when moving the disconnect clutch in the direction of its engaged state, the disconnect clutch is actuated by the electronic computing device, for example on the basis of a characteristic curve. This actuation results in the reaction moment and hence the described influencing of the rotational speed, especially its second curve. In the context of the method, therefore, the reaction moment resulting from the actuating of the disconnect clutch is determined. If the reaction moment corresponds to a desired moment, for example, the actuation and thus the engagement point, also known as the touch point, need not be changed.

However, if the determined reaction moment deviates, for example, from the desired moment, the actuation and hence the engagement point may be changed such that the deviation of the determined reaction moment from the desired moment is decreased or even abolished. Thus, the engagement or touch point can be adapted especially precisely and quickly, that is, in only a short time, by means of the method of the invention, since only the recorded curves of the rotational speed of the output shaft and the predetermined and, in particular, memorized friction torque of the internal combustion engine need to be consulted.

In particular, the invention is based on the understanding that situations, especially driving situations, often occur during a normal operation of the vehicle, in which the method can be carried out without noticeably influencing the respective driving situation for the passengers of the vehicle. Hence, it is possible with the method of the invention to adapt the engagement point sufficiently often and precisely during the operation of the vehicle. Such driving situations in which it is especially advantageous to carry out the method of the invention occur, in particular, when a hybrid flow control demands a transition from a hybrid driving to an electric driving. By hybrid driving is meant a mode or a driving state of the vehicle in which the vehicle is driven both by means of the electric machine and also by means of the internal combustion engine. By electric driving is meant a mode or a driving state of the vehicle in which the vehicle is driven solely by means of the electric machine, but not by means of the internal combustion engine.

In the course of the electric driving, the internal combustion engine may thus be shut off, that is, separated from the electric machine and deactivated. For the separating of the internal combustion engine from the electric machine, the disconnect clutch is disengaged, whereby the output shaft or the internal combustion engine is separated from the electric machine or the rotor of the electric machine. The method of the invention utilizes a transition from hybrid driving to electric driving wherein, during this transition, the output shaft coasts or ceases rotating, so that its rotational speed successively approaches 0. This rotational speed decrease or rotational speed change is utilized in the scope of the method of the invention to adapt the engagement point of the disconnect clutch in the described manner.

Hence, the method is further based on the understanding that the rotational speed gradient of the internal combustion engine or the output shaft is determined by only two quantities or values during the transition, that is, in a phase where the disconnect clutch is disengaged and the internal combustion engine is deactivated: a first quantity is the moment of inertia of the internal combustion engine, the moment of inertia also being known as the inertia factor. The second quantity is the friction torque of the internal combustion engine. Both quantities are known or can be ascertained in the manner described. In the third step, the friction torque of the internal combustion engine is verified, in order to finally calculate precisely the reaction moment of the disconnect clutch, so that the engagement point can be precisely adapted as a consequence.

By moving the disconnect clutch from the disengaged state in the direction of the engaged state, the rotational speed gradient in the second curve is influenced or changed as compared to the first curve, so that this rotational speed gradient change can be used to calculate a perturbing moment produced by the disconnect clutch and consequently, the reaction moment of the disconnect clutch.

In an advantageous embodiment of the invention, it is provided that no activating of the internal combustion engine occurs at least between the first step and the fifth step. This avoids any influencing of the rotational speed gradient caused by an activating of the internal combustion engine, so that the respective rotational speed gradient and hence the reaction moment can be ascertained especially precisely. After this, the engagement point can be precisely adapted. Moreover, this embodiment is based on the idea of ascertaining the curves of the rotational speed, and thus the rotational speed gradient, within precisely one transition from hybrid to electric driving, without activating the internal combustion engine, so that the engagement point can be adapted especially quickly and precisely.

It is possible to break off or interrupt the adaptation and to activate the internal combustion engine for this purpose after the first step and, for example, before at least one of the remaining steps of the method. Such an activating of the internal combustion engine is also called a switching on of the internal combustion engine. A demand to switch on the internal combustion engine will arrive, for example, based on a desire of the driver to have traction power, which can be provided by activating the internal combustion engine. Such a desire for traction power takes precedence over the adapting of the engagement point, so that the adapting is broken off or interrupted in order to switch on the internal combustion engine and satisfy the desire for traction power. Because situations in which the method can be carried out and thus the engagement point can be adapted may occur often in a normal operation, the described interrupting or terminating of the adaptation does not involve a disadvantage.

In this regard, moreover, it has been shown to be advantageous for the rotational speed of the output shaft to always be greater than 0, at least between the first step and the fifth step. In other words, the curves and the rotational speed gradient resulting from the disengaging of the disconnect clutch are determined before the output shaft comes to a standstill. Moreover, it has been shown to be an advantage when there is no engaging of the disconnect clutch or no moving of the disconnect clutch in the direction of its engaged state, at least between the first step and the fourth step.

In an advantageous embodiment of the invention, the rotational speed gradient is determined from the aforementioned rotational speed intervals of the respective curves, wherein the rotational speed of the output shaft in the respective rotational speed intervals is always greater than 0. Thus, no standstill of the output shaft occurs either in or between the rotational speed intervals, so that the engagement point can be adapted especially quickly.

In an especially advantageous embodiment of the invention it is provided that at least the first step, the second step, the fourth step and the fifth step are carried out while the vehicle is moving and rolling by its wheels along a roadway. In this way, the engagement point can be adapted precisely and sufficiently often during a normal driving operation of the vehicle, so that, for example, thermally related and/or wear-related changes in the engagement point can be compensated especially advantageously. Moreover, it has been shown to be advantageous when no standstill of the vehicle occurs, at least between the first step and the fifth step.

Another embodiment is characterized in that at least the first step, the second step, the fourth step and the fifth step are carried out while the vehicle is being driven by means of the electric machine. In this way, the engagement point can be adapted during a normal operation of the vehicle, without making this operation noticeable to the passengers of the vehicle.

Finally, it has been shown to be especially advantageous for the disconnect clutch, during the fifth step, to be moved in the direction of its engaged state in such a way that the reaction moment lies in a range of 10 Newton-meters up to and including 20 Newton-meters. In this way, an especially precisely recordable influencing or changing of the rotational speed gradient can be accomplished, so that the reaction moment can be precisely ascertained with the aid of the especially precisely recorded change in the rotational speed gradient. As a result, the engagement point can be adapted especially precisely.

The invention also includes a method for operating a motor vehicle, especially a hybrid vehicle, by means of a method according to the invention. In other words, it is preferably proposed to employ the method of the invention in a motor vehicle, especially in a hybrid vehicle, whereby an especially advantageous operation as well as a more comfortable and efficient operation of the motor vehicle can be realized by means of the method according to the invention.

Further advantages, features and details of the invention will emerge from the following description of a preferred exemplary embodiment as well as the drawing. The features and combinations of features mentioned above in the description, as well as the features and combinations of features mentioned in the description of the figures, and/or depicted standing alone in the figures, may be used not only in the particular indicated combination, but also in other combinations or standing alone, without leaving the scope of the invention.

BRIEF DESCRIPTION OF THE DRAWING

The drawing shows in.

In the figures, the same or functionally identical elements are given the same reference numbers.

DETAILED DESCRIPTION

Figure 1:
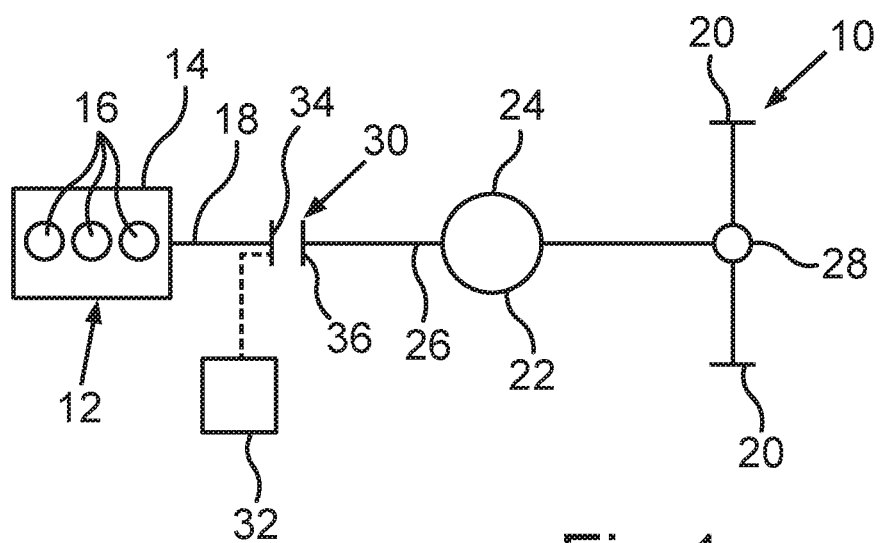
FIG. 1 a schematic representation of a drive train for a vehicle, wherein a method is carried out by means of which an engagement point of a disconnect clutch of the drive train can be adapted especially precisely and quickly.

FIG. 1 shows, in a schematic representation, a drive train for a vehicle, denoted as overall by reference 10, the vehicle being designed as a motor vehicle, especially a hybrid vehicle. The drive train 10 comprises an internal combustion engine 12, which is designed as a reciprocating internal combustion machine. The internal combustion engine 12 comprises a cylinder housing 14, in which a plurality of combustion chambers are formed in the shape of cylinders 16. Moreover, the internal combustion engine 12 comprises an output shaft, designed as a crankshaft 18, which is mounted, for example, on a housing element of the internal combustion engine 12 and can rotate about a rotary axis relative to the housing element. By way of the crankshaft 18, the internal combustion engine 12 provides torques for driving the motor vehicle. The motor vehicle furthermore comprises wheels, by which the motor vehicle can roll along a roadway during driving, especially during forward driving. Of these wheels, two wheels of the motor vehicle are shown in FIG. 1, denoted as reference 20. The wheels 20 are so-called driven or drivable wheels, since the wheels 20 can be driven by means of the internal combustion engine 12 via the crankshaft 18. The drive train 10 is designed as an alternative drive and comprises an electric machine 22. The wheels 20 and the motor vehicle overall can be propelled by means of the internal combustion engine 12 and also by means of the electric machine 22. The internal combustion engine 12 comprises, for example, a stator 24 shown very schematically in FIG. 1. Moreover, the electric machine 22 comprises a rotor 26, which can rotate about an axis of rotation relative to the stator 24. The electric machine 22 can be operated, for example, in a motor mode and hence as an electric motor. In the motor mode, the rotor 26 is driven by the stator 24. For this purpose, the electric machine 22 in its motor mode is supplied with electrical energy or electric current. This electrical energy is provided for example from an electrical energy accumulator in the form of a battery and supplied to the electric machine 22.

In the present instance, the rotor 26, which comprises, for example, at least one rotor shaft, is arranged coaxially to the crankshaft 18, so that the axis of rotation about which the rotor 26 can rotate relative to the stator 24 coincides with the axis of rotation about which the crankshaft 18 can rotate relative to the housing element.

The drive train 10 comprises a differential 28. The electric machine 22 in its motor mode can provide torques via the rotor 26 for propelling the wheels 20 and thus for propelling the motor vehicle overall. The torques provided by the internal combustion engine 12 via the crankshaft 18 as well as the torques provided by the electric machine 22 via the rotor 26 for propelling the motor vehicle may be transmitted across the differential 28 to the wheels 20, so that the wheels 20 and hence the motor vehicle as a whole are driven.

The drive train 10 further comprises a disconnect clutch 30, which is arranged between the crankshaft 18 and the rotor 26, for example, when referred to a flow of torque from the crankshaft 18 to the rotor 26, or vice versa. For example, the disconnect clutch 30 is designed as a friction clutch. In particular, the disconnect clutch 30 is designed as a multi-plate clutch, especially as a wet multi-plate clutch, so that the disconnect clutch 30 comprises coupling plates, for example, which run in a liquid lubricant, especially oil.

The disconnect clutch 30 can be moved between at least one engaged state and at least one disengaged state. In particular, the disconnect clutch 30 can be moved automatically between the disengaged state and the engaged state. For this purpose, an electronic computing device 32 is provided, which is also called a controller. The controller actuates the disconnect clutch 30, so that, for example, the disconnect clutch 30 is moved by means of the controller automatically between the engaged state and the disengaged state via an actuator, not shown in detail in FIG. 1. In other words, a movement of the disconnect clutch 30 occurs from the disengaged state to the engaged state, or vice versa, from a corresponding actuation of the disconnect clutch 30, brought about by the controller.

In the engaged state, the crankshaft 18 is connected via the disconnect clutch 30 to the rotor 26, so that, for example, torques can be transmitted between the crankshaft 18 and the rotor 26 by way of the disconnect clutch 30. In the disengaged state, the crankshaft 18 is decoupled from the rotor 26, so that in the disengaged state, the disconnect clutch 30 cannot transmit any torques between the crankshaft 18 and the rotor 26 by way of the disconnect clutch 30.

In the context of a hybrid driving of the motor vehicle, the disconnect clutch 30 is engaged. In other words, in the course of the hybrid driving, the disconnect clutch 30 is in its engaged state, so that the wheels 20 or the motor vehicle are driven both by means of the electric machine 22 and also by means of the internal combustion engine 12.

In the context of an electric driving of the motor vehicle, the disconnect clutch 30 is disengaged, so that the wheels 20 and hence, in regard to the internal combustion engine 12 and the electric machine 22, the motor vehicle are driven only by means of the electric machine 22. Hence, upon transition from hybrid driving to electric driving there occurs a disengaging of the disconnect clutch 30. In the course of this disengaging, the disconnect clutch 30 is moved or transferred from its engaged state to its disengaged state. Hence, the disengaged disconnect clutch 30 is understood to mean that the disconnect clutch 30 is in its disengaged state.

The disconnect clutch 30 has an engagement point, which is also called the touch point. The engagement point is, for example, a position of the disconnect clutch 30, especially a position of coupling members 34 and 36 of the disconnect clutch 30, whereby, for example, a rotation of the crankshaft 18 by the rotor 26 is influenced via the disconnect clutch 30 in this position. In other words, if the disconnect clutch 30 or the coupling members 34 and 36, for example, are moved from the disengaged state in the direction of the engaged state, then the engagement point is that position of the disconnect clutch 30 or the coupling members 34 and 36 in which there occurs a transmittal of a given torque by way of the disconnect clutch 30 and thus an influencing of the rotation of the crankshaft 18 by the rotor 26 by way of the disconnect clutch 30, or vice versa. Before reaching this position, no torque or only a negligibly small torque is transmitted by the disconnect clutch 30, or before reaching the mentioned position, there is no noticeable influencing of the rotation of the crankshaft 18 by the rotor 26 by way of the disconnect clutch 30, or vice versa.

The engagement point of the disconnect clutch 30 may vary, for example, due to wear and/or temperature. Moreover, it is possible for the engagement point to vary as a result of component tolerances. Such a variation or changing of the engagement point should be compensated in the course of an adapting of the engagement point, in order to assure an efficient and comfortable operation of the drive train 10 throughout the long service life of the drive train 10. Namely, by adapting the engagement point, it is possible to adjust the disconnect clutch 30 as needed and, in particular, comfortably, even with variation of the engagement point, so that, for example, jerky movements of the disconnect clutch 30, which can be felt by passengers of the motor vehicle, can be avoided. In particular, it is possible by the adapting of the engagement point to allow large scatter in components in a mass production process, so that the vehicle can be manufactured easily and economically.

Now, in order to adapt the engagement point of the disconnect clutch 30 in an especially precise and rapid manner, that is, in a brief time, the initially activated internal combustion engine 12—especially starting from hybrid driving—is deactivated, and the initially engaged disconnect clutch 30 is disengaged.

Figure 2:
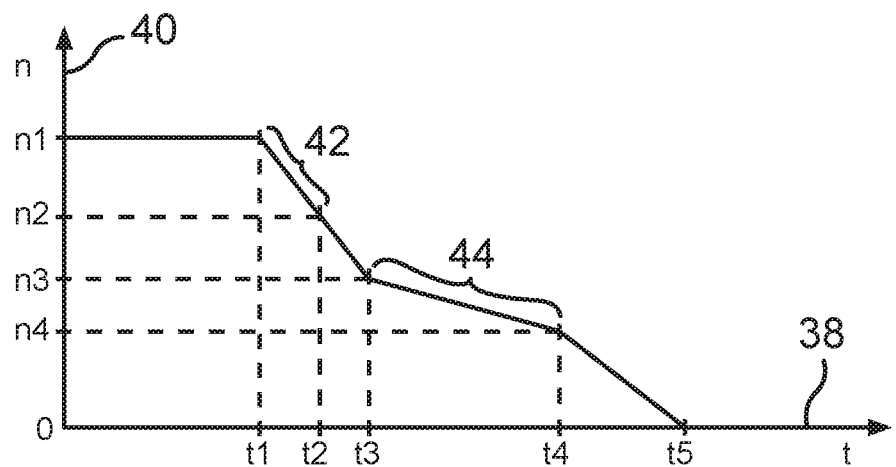
FIG. 2 a diagram to illustrate the method.

FIG. 2 shows a diagram for illustrating a method for adapting the engagement point. On the abscissa 38 of the diagram is plotted the time t, and on the ordinate 40 of the diagram is plotted the rotational speed n of the crankshaft 18 and thus of the internal combustion engine 12. For example, at a first time t1, the initially engaged disconnect clutch 30 is disengaged and the initially activated internal combustion engine 12 is deactivated. On account of the disengaging of the disconnect clutch 30 and on account of the deactivating of the internal combustion engine 12, the rotational speed of the crankshaft 18 decreases, starting from the first time t1.

In order to drive the motor vehicle by means of the internal combustion engine 12, the internal combustion engine 12 is operated in its fired operation. In the course of the fired operation, combustion processes take place in the cylinders 16, during which a particular fuel/air mixture is burned in the respective cylinder 16. By the deactivation of the internal combustion engine 12, the fired operation is ended, so that the internal combustion engine 12 is transferred from its fired operation to its unfired operation. The unfired operation is also called the non-fired operation, during which no combustion processes take place in the cylinders 16. Hence, starting from the first time t1, the crankshaft 18 is driven neither by combustion processes taking place in the cylinders 16 nor by the rotor 26 by way of the disconnect clutch 30, so that the rotational speed of the crankshaft 18 decreases.

During a second step of the method—while the disconnect clutch 30 is disengaged and the internal combustion engine 12 is deactivated—a first curve 42 of the rotational speed of the crankshaft 18 is recorded. The first curve 42 has a first rotational speed interval, which extends from a first rotational speed n1 to a second rotational speed n2 of the crankshaft 18. Since the rotational speed of the crankshaft 18 is decreasing starting from the time t1, the second rotational speed n2 is less than the first rotational speed n1. Thus, in the first rotational speed interval there occurs a decreasing of the rotational speed of the crankshaft 18. This decreasing of the rotational speed in the first rotational speed interval occurs with a first rotational speed gradient, which is determined from the recorded first curve 42, especially being calculated by means of the controller.

In a third step of the method, a friction torque of the internal combustion engine 12 is ascertained as a function of at least one given moment of inertia of the internal combustion engine 12 and as a function of the first rotational speed gradient. The friction torque of the internal combustion engine 12 is denoted for example as $J_{VM}$ and is stored, for example, in a storage device of the electronic computing device 32 (controller). The friction torque of the internal combustion engine 12 is denoted for example as $M_{reib}$. Thus, the friction torque $M_{reib}$ is given as:

$$M_{reib} = J_{VM} * \dot{\omega}_{VM1}.$$

Here, $\dot{\omega}_{VM1}$ denotes the mentioned first rotational speed gradient. On the whole, it can be seen from FIG. 2 that there is no influencing of the rotational speed of the crankshaft 18 brought about by the disconnect clutch 30 in the first rotational speed interval, since the disconnect clutch 30 is and remains disengaged in the first rotational speed interval.

In the fourth step of the method, the disconnect clutch 30 is moved from its disengaged state in the direction of its engaged state. For example, at a second time t2, following the first time t1, the moving of the disconnect clutch 30 in the direction of its engaged state has begun. By the moving of the disconnect clutch 30 in the direction of its engaged state is understood to mean, for example, that the disconnect clutch 30, especially the coupling members 34 and 36, starting from the disengaged state, are moved or adjusted in the direction of the aforementioned position, and hence in the direction of the engaged state, but not entirely to the engaged state, for example.

Between the second time t2 and a third time t3, following the second time t2, the disconnect clutch 30, despite the commencement of the moving of the disconnect clutch 30 in the direction of the engaged state, for example, is still disengaged so much that there is no influencing of the rotational speed of the crankshaft 18. But starting from the third time t3, the rotational speed of the crankshaft 18 and especially its rotational speed change are influenced by the disconnect clutch 30, since the disconnect clutch 30, especially the coupling members 34 and 36, have reached the mentioned engagement point at the third time t3. In a fifth step of the method—while the disconnect clutch 30 is moving in the direction of its engaged state and the internal combustion engine 12 is still deactivated—a second curve 44 of the rotational speed of the crankshaft 18 is recorded. The second curve 44 comprises a second rotational speed interval, which extends from a third rotational speed n3 to a fourth rotational speed n4, the third rotational speed n3 being, for example, less than the second rotational speed n2, and the fourth rotational speed n4 being, for example, less than the third rotational speed n3. The curves 42 and 44 may be spaced apart from each other. Alternatively, it is conceivable for the second curve 44 to border directly on the first curve 42, so that the second rotational speed n2 corresponds to the third rotational speed n3. In a sixth step of the method, a second rotational speed gradient is ascertained from the recorded second curve 44. This second rotational speed gradient is denoted by $\dot{\omega}_{VM2}$ and is influenced by the disconnect clutch 30, since the disconnect clutch 30 has already become so much engaged, at least during a portion of the second curve 44 or the second rotational speed interval, that the rotational speed of the crankshaft 18 is influenced by the rotor 26 by way of the disconnect clutch 30.

In a seventh step of the method, a reaction moment $M_{K0}$ of the disconnect clutch 30 is calculated as a function of the calculated friction torque $M_{reib}$, as a function of the second rotational speed gradient $\dot{\omega}_{VM2}$ and as a function of the given moment of inertia $J_{VM}$. The reaction moment $M_{K0}$ for example is given as:

$$M_{K0} = M_{ges} - M_{reib}.$$

Here $M_{ges}$ denotes an overall moment, which is given by:

$$M_{ges} = J_{VM} * \dot{\omega}_{VM2}.$$

Since the moment of inertia $J_{VM}$ is given or saved in memory and the rotational speed gradients $\dot{\omega}_{VM1}$ and $\dot{\omega}_{VM2}$ are determined from the recorded curves 42 and 44, the reaction moment $M_{K0}$ can be calculated quickly and precisely. In this way, during an eighth step of the method, the engagement point can be adapted as a function of the ascertained reaction moment $M_{K0}$.

In the course of the fourth step of the method, the disconnect clutch 30 is moved by a corresponding actuation in the direction of the engaged state, this actuation occurring from the electronic computing device 32 to the disconnect clutch 30. Thus, with the aid of the method, the reaction moment resulting from the corresponding actuation of the disconnect clutch 30 can be ascertained. For example, if the ascertained reaction moment corresponds to a desired moment, the actuation need not be changed. But if the ascertained reaction moment deviates from the desired moment, this indicates a wear and/or temperature-related change in the engagement point, so that the actuation and hence the engagement point may be adapted such that the deviation between the desired moment and the ascertained reaction moment is at least decreased or even abolished.

The described method may be carried out, in particular, while the motor vehicle is rolling by its wheels 20 along the roadway, and especially while the wheels 20 and the motor vehicle are being driven by means of the electric machine 22. In such a normal operation, driving situations often occur in which the described method can be carried out, so that the engagement point can be adapted sufficiently often and precisely.

The invention claimed is:

1. A method for adapting an engagement point of a disconnect clutch that can be moved between at least one engaged state, in which an output shaft of an internal combustion engine for propelling a vehicle is coupled by way of the disconnect clutch to a rotor of an electric machine for propelling the vehicle, and at least one disengaged state, in which the output shaft is decoupled from the rotor, comprising:
   a) deactivating the initially activated internal combustion engine and disengaging the initially engaged disconnect clutch;
   b) while the disconnect clutch is disengaged and the internal combustion engine is deactivated: recording a first curve of the rotational speed of the output shaft;
   c) calculating a friction torque of the internal combustion engine as a function of at least one predetermined moment of inertia of the internal combustion engine and a first rotational speed gradient, which is determined from the recorded first curve;
   d) moving the disconnect clutch in the direction of its engaged state;
   e) while the disconnect clutch is being moved in the direction of its engaged state and the internal combustion engine is still deactivated: recording of a second curve of the rotational speed of the output shaft coming after the first curve;
   f) determining a second rotational speed gradient from the recorded second curve;
   g) determining a reaction moment of the disconnect clutch as a function of the calculated friction torque, the second rotational speed gradient and the predetermined moment of inertia of the internal combustion engine; and
   h) adapting the engagement point as a function of the determined reaction moment.

2. The method as claimed in claim 1, wherein activation of the internal combustion engine does not occur, at least between step a) and step e).

3. The method as claimed in claim 1, wherein the rotational speed of the output shaft is always greater than 0, at least between step a) and step e).

4. The method as claimed in claim 1, wherein the rotational speed gradients are determined from respective rotational speed intervals of the respective curves, wherein the rotational speed of the output shaft in the respective rotational speed intervals is always greater than 0.

5. The method as claimed in claim 1, wherein at least the steps a), b), d) and e) are carried out while the vehicle is moving and rolling by its wheels on a roadway.

6. The method as claimed in claim 5, wherein at least the steps a), b), d) and e) are carried out while the vehicle is being driven by means of the electric machine.

7. The method as claimed in claim 1, wherein during step e) the disconnect clutch is moved in the direction of its engaged state such that the reaction moment lies in a range of 10 Newton-meters up to and including 20 Newton-meters.

\* \* \* \* \*